United States Patent
Hosoda et al.

(10) Patent No.: US 7,618,552 B2
(45) Date of Patent: Nov. 17, 2009

(54) LIQUID-CRYSTALLINE POLYMER COMPOSITION, METHOD FOR PRODUCING THE SAME, AND MOLDED ARTICLE USING THE SAME

(75) Inventors: Tomoya Hosoda, Tsukuba (JP); Satoshi Okamoto, Tsukuba (JP); Toru Fujiki, Tsukuba (JP); Shinji Ohtomo, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 242 days.

(21) Appl. No.: 11/704,232

(22) Filed: Feb. 9, 2007

(65) Prior Publication Data

US 2007/0200094 A1    Aug. 30, 2007

(30) Foreign Application Priority Data

Feb. 13, 2006    (JP) .............................. 2006-035644

(51) Int. Cl.
*C09K 19/00* (2006.01)
*C09K 19/06* (2006.01)
*C09K 19/52* (2006.01)

(52) U.S. Cl. .............................. 252/299.01; 252/299.6; 430/20; 430/270.1; 428/1.1; 428/1.2

(58) Field of Classification Search ............ 252/299.01, 252/299.6; 430/20, 270.1; 428/1.1, 1.2
See application file for complete search history.

(56) References Cited

U.S. PATENT DOCUMENTS

| | | | |
|---|---|---|---|
| 5,191,057 A * | 3/1993 | Niki et al. .................... | 528/190 |
| 5,244,975 A | 9/1993 | Asai et al. | |
| 5,766,507 A | 6/1998 | Nakai | |
| 5,976,406 A | 11/1999 | Nagano et al. | |
| 6,656,386 B2 | 12/2003 | Suenaga et al. | |
| 6,702,955 B1 | 3/2004 | Murakami et al. | |
| 6,733,691 B2 | 5/2004 | Nagano et al. | |
| 7,179,401 B2 * | 2/2007 | Ueno et al. ............. | 252/299.01 |
| 2007/0293633 A1 * | 12/2007 | Hosoda et al. ............... | 525/390 |

FOREIGN PATENT DOCUMENTS

| | | |
|---|---|---|
| JP | 2-88667 | 3/1990 |
| JP | 8-231832 | 9/1996 |
| JP | 2005-298772 | 10/2005 |

* cited by examiner

*Primary Examiner*—Geraldina Visconti
(74) *Attorney, Agent, or Firm*—Foley & Lardner LLP (57) ABSTRACT

A liquid-crystalline polymer composition with less warpage not only in molding but also in a high temperature treatment conducted after molding is provided. The liquid-crystalline polymer comprises (i) 30 to 95% by weight of a first liquid-crystalline polymer having a deflection temperature under load of 200° C. or higher and (ii) 5 to 70% by weight of a second liquid-crystalline polymer having a deflection temperature under load lower than that of the first liquid-crystalline polymer, a melting point from 270° C. to lower than 400° C. and a flow-beginning temperature of 270° C. or higher.

13 Claims, 1 Drawing Sheet

Fig. 1

LIQUID-CRYSTALLINE POLYMER COMPOSITION, METHOD FOR PRODUCING THE SAME, AND MOLDED ARTICLE USING THE SAME

BACKGROUND OF THE INVENTION

1. Field of the Invention

The present invention relates to a liquid-crystalline polymer composition and a method for producing the composition, and to a molded article and a planate connector using the composition.

2. Description of the Related Art

Thermoplastic resin, which is excellent in moldability, is often used for electronic parts such as a printed circuit board, a semiconductor, a connector, a relay and a switch. On the other hand, in addition to moldability, excellent heat resistance and strength are also needed particularly in electronic parts used for surface mounting, and liquid-crystalline polymer is used as the material which meets such demands. In order to apply the liquid-crystalline polymer to various applications, attempts to improve various characteristics of the polymers have been actively performed.

For example, aiming at improving the moldability of the liquid-crystalline polymer, methods for improving flowability of the liquid-crystalline polymer by adding various materials are proposed. Specifically, the following methods have been disclosed: a method for adding an oligomer of p-hydroxybenzoic acid to a liquid-crystalline polymer (Japanese Patent Application Laid-open Publication No. 3-252457 corresponding to U.S. Pat. No. 5,244,975); a method for blending a liquid-crystalline polymer of low molecular weight with a liquid-crystalline polymer (Japanese Patent Application Laid-open Publication No. 3-252457 corresponding to U.S. Pat. No. 5,244,975 and Japanese Patent No. 2823873 corresponding to U.S. Pat. No. 5,766,507); and a method for mixing liquid-crystalline polyesters resins having different melting points (Japanese Patent Application Laid-open Publication No. 2002-249647 corresponding to U.S. Pat. No. 6,656,386).

Moreover, in recent years, a miniaturization of electronic parts and making them to be thin-walled are advanced, and as for liquid-crystalline polymers used for electronic parts, especially for connectors, it is required to decrease the generation of warpage in a molded article while maintaining excellent flowability, heat resistance and mechanical strength.

Trying to obtain such a liquid-crystalline polymers decreasing the generation of warpage, the one in which glass fiber is filled to a liquid-crystalline polyester resin so that a number average fiber length may become 0.12 to 0.25 mm (Japanese Patent No. 3045065), the one in which fibrous fillers and granular fillers are added to a liquid-crystalline polymer (Japanese Patent Application Laid-open Publication No. 2000-178443 corresponding to U.S. Pat. No. 6,702,955), the one in which fibrous and/or plate-like inorganic fillers are used in the combination of two kinds of liquid-crystalline polymers with different flow temperatures (Japanese Patent Application Laid-open Publication No. 10-219085 corresponding to U.S. Pat. No. 5,976,406) and the like have been proposed. In addition, aiming at obtaining a liquid-crystalline polymer which may have good heat resistance and flowability and may decrease the generation of warpage in the molded article even when a thinner molded article is formed, the one in which fibrous inorganic fillers and/or plate-like inorganic fillers which meet the prescribed conditions are added to a prescribed liquid-crystalline polyester (Japanese Patent Application Laid-open Publication No. 2002-294038 corresponding to U.S. Pat. No. 6,733,691) has been proposed.

Moreover, the liquid-crystalline polymer composition in which rigidity may be improved without accompanying lowering flowability, compared to a case when each component of liquid-crystalline polymers is singly used (Japanese Patent Application Laid-Open No. 2005-298772), also has been proposed.

SUMMARY OF THE INVENTION

However, in recent years, it is requested to produce electronic parts and the like more precisely, and therefore, the liquid-crystalline polymer composition with much less warpage in a molded article is requested to meet such a request.

Further, a liquid-crystalline polymer composition with less warpage not only in molding but also in a high temperature treatment conducted after molding is requested. This is because a solder reflow treatment at high temperature is often conducted to the molded article of liquid-crystalline polymer for the surface mounting.

Accordingly, the present invention is performed considering such circumstances, and aims to provide the liquid-crystalline polymer composition with less warpage not only in molding but also in a high temperature treatment conducted after molding. The present invention also aims to provide a method for producing such a liquid-crystalline polymer composition, and molded articles and planate connectors using the liquid-crystalline polymer.

The present invention provides a liquid-crystalline polymer composition comprising:

(i) 30 to 95% by weight of a first liquid-crystalline polymer having a deflection temperature under load of 200° C. or higher, and (ii) 5 to 70% by weight of a second liquid-crystalline polymer having a deflection temperature under load lower than that of the first liquid-crystalline polymer, a melting point from 270° C. to lower than 400° C. and a flow-beginning temperature of 270° C. or higher.

As for a molding article obtained from the liquid-crystalline polymer composition of the present invention, the generation of warpage can be suppressed not only in the molding but also in a high temperature treatment conducted after the molding. The molding article is sufficient in mechanical strength such as flexural strength, and tends to be difficult to foam or swell in a reflowing treatment.

The liquid-crystalline polymer of the present invention is a so-called thermotropic liquid-crystalline polymer, which is a polymer showing liquid crystallinity when being melted.

In the present invention, a deflection temperature under load of the polymer can be measured in accordance with ASTM D648 under the load of 18.6 kg/cm$^2$ using a test piece (127 mm in length, 12.7 mm in width and 6.4 mm in thickness) of a molded article made of the liquid-crystalline polymer or the like to be measured. The melting point in the present invention can be obtained using differential scanning calorimetry (DSC) while raising a temperature at a rate of from 10 to 25° C./min.

A flow-beginning temperature of the polymer in the present invention can be measured as follows:

Using a flow tester, a sample polymer to be measured is packed in a capillary-type rheometer having a nozzle with an inner diameter of 1 mm and length of 10 mm and is subjected to a load of 9.8 MPa (i.e., about 100 kg/cm$^2$). While extruding the sample polymer from a nozzle of the rheometer, a temperature at which the samples has a melt viscosity of 4800

Pa·s (i.e., about 48000 Poise) is regarded as a flow-beginning temperature of the sample polymer.

The liquid-crystalline polymer composition of the present invention is excellent in flowability and suppress the generation of warpage in a molded article thereof at the time of molding and during a high temperature processing (treatment) conducted after the molding. Also, the liquid-crystalline polymer has an excellent heat resistance. Moreover, according to the present invention, a molded article (particularly, a planate connector) with less warpage which may be generated due to high temperature processing.

Such effects are attained by the following way. That is, at least two kinds of liquid-crystalline polymer components used in the liquid-crystalline polymer composition are properly adjusted so that at least one of the liquid-crystalline polymer components has a deflection temperature under load of about 200° C. or higher, and the other liquid-crystalline polymer component having a lower deflection temperature under load has a melting point and has a flow-beginning temperature of 270° C. or higher.

In the liquid-crystalline polymer composition of the present invention, the first liquid-crystalline polymer preferably has a monomeric unit derived from aromatic hydroxycarboxylic acid, a monomeric unit derived from aromatic diol and a monomeric unit derived from aromatic dicarboxylic acid. The molecule of such a liquid-crystalline polymer tends to be rigid and have liquid-crystallinelinity. Therefore, the first liquid-crystalline polymer serves to improve flowability and heat resistance in the composition containing the first polymer and to reduce warpage in the resulting molding article using the composition.

Moreover, the second liquid-crystalline polymer preferably has 10 to 45% by mole of at least one monomeric unit selected from the group consisting of a monomeric unit having 1,3-phenylene skeleton, a monomeric unit having 2,3-phenylene skeleton and a monomeric unit of 2,3-naphthylene skeleton.

The above-mentioned skeletons all have crooked structures. The second liquid-crystalline polymer having such monomeric units at the above-mentioned prescribed rate has a crooked structure in its molecule and tends to have a properly decreased liquid-crystallinelinity (anisotropy). Consequently, such a second liquid-crystalline polymer serves to favorably decrease the anisotropy of the composition containing the second polymer so that the generation of warpage in and after molding is further decreased.

The present invention also provides a molded article comprising the above-mentioned liquid-crystalline polymer composition of the present invention. A planate connector is one of the suitable molded articles obtained in the present invention. Using the above-mentioned liquid-crystalline polymer of the present invention, the resulting molded article has less warpage. Even when the molded article is mounted on a substrate followed by a solder ref lowing treatment, the molded article is excellent in shape stability in the reflowing treatment.

DETAILED DESCRIPTION OF THE PREFERRED EMBODIMENTS

A liquid-crystalline polymer composition in the present invention contains a first liquid-crystalline polymer having a deflection temperature under load of 200° C. or higher and a second liquid-crystalline polymer having a deflection temperature under load lower than that of the first liquid-crystalline polymer.

The first liquid-crystalline polymer is a thermotropic liquid-crystalline polymer which can show liquid-crystallinelinity in melting. The first polymer has a deflection temperature under load of 200° C. or higher, preferably 220° C. or higher.

The upper limit of the deflection temperature under load of the first polymer is not limited, but the deflection temperature may be lower than 400° C.

As for the first liquid-crystalline polymer, there is no limitation in a melting point. That is, the first liquid-crystalline polymer may be an amorphous polymer having no melting point which can be observed, or may be a polymer having a crystalline structure where the melting point is observed. As for the glass transition temperature, although there is especially no limitation, the first liquid-crystalline polymer preferably has no glass transition temperature which can be observed.

Examples of the first liquid-crystalline polymer include a wholly aromatic polyester, an aromatic and aliphatic polyester, a wholly aromatic polyesteramide, an aliphatic polyazomethine, and an aromatic polyester and carbonate. Among them, the wholly aromatic polyester and polyesteramide tend to have excellent heat resistance, desirably.

Among them, the wholly aromatic polyester is preferred from the viewpoint of decreasing water-absorbing of the liquid-crystalline polymer composition to reduce dimensional change in molding. Here, "wholly aromatic polymer" means that most of the monomeric units in the polymer have aromatic rings, and preferably have benzene rings. More specifically, the wholly aromatic polymer may have 50% or more of aromatic monomeric units, and preferably has 80% or more of aromatic monomeric units.

Examples of the wholly aromatic polyester suitable as the first liquid-crystalline polymer include a polymer having a monomeric unit derived from aromatic hydroxycarboxylic acid, a monomeric unit derived from aromatic diol and a monomeric unit derived from aromatic dicarboxylic acid. Here, "the monomeric unit derived from" a specific monomer means a structural unit formed by the polymerization of the specific monomer. Namely, each monomeric unit derived from a specific monomer contains the structure of the monomer as it is, with no contribution in the polymerization.

Examples of preferable monomer providing the unit in the wholly aromatic polyesters include an aromatic hydroxycarboxylic acid, an aromatic diol and an aromatic dicarboxylic acid.

Specific examples of the aromatic hydroxycarboxylic acid include p-hydroxybenzoic acid, m-hydroxybenzoic acid, 2-hydroxy-6-naphthoic acid, 2-hydroxy-3-naphthoic acid, 1-hydroxy-4-naphthoic acid, 4-hydroxy-4'-carboxydiphenyl ether, 2,6-dichloro-p-hydroxybenzoic acid, 2-chloro-p-hydroxybenzoic acid, 2,6-difluoro-p-hydroxybenzoic acid, and 4-hydroxy-4'-biphenylcarboxylic acid. These may be singly used, or two or more kinds of them may be used in combination.

Among these, p-hydroxybenzoic acid and 2-hydroxy-6-naphthoic acid are preferred since the resulting first liquid-crystalline polymer tends to have a deflection temperature under load in the above-mentioned range, and is also available, easily.

Specific examples of the aromatic diols include hydroquinone, resorcin, methylhydroquinone, chlorohydroquinone, acetoxyhydroquinone, nitrohydroquinone, 4,4'-dihydroxybiphenyl, 1,4-dihydroxynaphthalene, 1,5- dihydroxynaphthalene, 1,6-dihydroxynaphthalene, 2,6-dihydroxynaphthalene, 2,7-dihydroxynaphthalene, 2,2-bis(4-hydroxyphenyl)propane, 2,2-bis(4-hydroxy-3,5-dimethyphenyl)propane, 2,2-bis(4-hydroxy-3,5-dichlorophenyl)propane, 2,2-bis(4-hydroxy-3-methylphenyl)propane, 2,2-bis(4-hydroxy-3-chlorophenyl)propane, bis-(4-hydroxyphenyl)methane, bis-(4-hydroxy-3,5-dimethylphenyl)methane, bis-(4-hydroxy-3,5-dichlorophenyl)methane, bis-(4-hydroxy-3,5-dibromophenyl)methane, bis-(4-hydroxy-3-methylphenyl)methane, bis-(4-hydroxy-3-chlorophenyl)methane, 1,1-bis(4-hydroxyphenyl)cyclohexane, bis-(4-hydroxyphenyl)ketone, bis-(4-hydroxy-3,5-dimethylphenyl)ketone, bis-(4-hydroxy-3,5-dichlorophenyl)ketone, bis-(4-hydroxyphenyl)sulfide, and bis-(4-hydroxyphenyl)sulfone. These may be singly used, or two or more kinds of them may be used in combination.

Among these, 4,4'-dihydroxybiphenyl, hydroquinone, resorcin and 2,6-dihydroxynaphthalene are preferred, since the resulting first liquid-crystalline polymer tends to have high heat resistance, and is also available, easily.

Specific examples of the aromatic dicarboxylic acids include terephthalic acid, isophthalic acid, 2,6-naphthalene-dicarbocylic acid, 1,5-naphthalenedicarboxylic acid, 4,4'-biphenyldicarboxylic acid, methylterephthalic acid, methylisophthalic acid, diphenylether-4,4'-dicarboxylic acid, diphenylsulfone-4,4'-dicarboxylic acid, diphenylketone-4,4'-dicarboxylic acid, and 2,2'-diphenylpropane-4,4'-dicarboxylic acid. These may be singly used, or two or more kinds of them may be used in combination.

Among these, terephthalic acid, isophthalic acid and 2,6-naphthalenedicarbocylic acid are preferred, since the resulting first liquid-crystalline polymer tends to have high heat resistance, and is also available, easily.

More preferably, the first liquid-crystalline polymer has 30 to 80% by mole of a monomeric unit derived from aromatic hydroxycarboxylic acid, 10 to 35% by mole of a monomeric unit derived from aromatic diol and 10 to 35% by mole of a monomeric unit derived from aromatic dicarboxylic acid. Such a first liquid-crystalline polymer having such a structure tends to have the deflection temperature under load in the range described above. Such a first liquid-crystalline polymer can be obtained by mixing the monomers corresponding the monomeric units at the above-mentioned rate and polymerizing the monomers.

The first liquid-crystalline polymer preferably has the monomeric units mentioned above. More preferably, the first liquid-crystalline polymer has a crooked structure in the amount of smaller than that of the following second liquid-crystalline polymer. Particularly, it is preferred that the content of the monomeric unit with the crooked structure in the first liquid-crystalline polymer is smaller than 10% by mole. In such a case, the deflection temperature under load of the first liquid-crystalline polymer tends to be in the suitable range described above. Examples of the monomeric units having the crooked structure include monomeric units having 1,3-phenylene skeleton, monomeric units having 2,3-phenylene skeleton, and monomeric units having 2,3-naphthylene skeleton.

The second liquid-crystalline polymer is a thermotropic liquid-crystalline polymer which shows liquid-crystallinelinity when being melted, and is a polymer having a lower deflection temperature under load than that of the first liquid-crystalline polymer. The second liquid-crystalline polymer preferably has an ester bond. Namely, the second liquid-crystalline polymer is preferably a liquid-crystalline polyester. The second liquid-crystalline polymer preferably has no amide bond.

The deflection temperature under load of the second liquid-crystalline polymer is preferably 190° C. or lower, and is more preferably 150° C. or lower.

The lower limit of the deflection temperature under load of the second polymer is not limited, but the deflection temperature may be higher than 50° C.

Moreover, the second liquid-crystalline polymer has the melting point of from 270° C. to 400° C. As described above, such a melting point can be observed with the differential scanning calorimetry (DSC) while raising a temperature at a rate of from 10 to 25° C./min. Particularly, the melting point of the second liquid-crystalline polymer is more preferably 295° C. or higher, and further preferably 310° C. or higher. However, when this melting point is 400° C. or higher, an excessive high temperature may be needed for molding, and the deterioration of the liquid-crystalline polymer composition may be caused at the time of molding. For this reason, the melting point of the second liquid-crystalline polymer is preferably lower than 400° C.

Further, the second liquid-crystalline polymer is preferably a polymer having glass transition temperature. The glass transition temperature of the second liquid-crystalline polymer is preferable in the range of from 50 to 200° C., is more preferable in the range of from 70 to 180° C., and is most preferably in the range of from 100 to 180° C. When the second liquid-crystalline polymer has the glass transition temperature as just described, the deflection temperature under load of the second liquid-crystalline polymer tends to be in the above-mentioned suitable range, and the residual stress of the resulting molded article can be decreased. As a result, the warpage in the molded article can be decreased more effectively. Here, the glass transition temperature can be measured by the above-mentioned DSC measurement.

The second liquid-crystalline polymer has a flow-beginning temperature of 270° C. or higher. When the flow-beginning temperature of the second liquid-crystalline polymer is lower than 270° C., a molding article obtained from the resulting polymer composition may foam or swell in a solder reflowing treatment. The second liquid-crystalline polymer preferably has a flow-beginning temperature of 277° C. or higher. The upper limit of the flow-beginning temperature is not limited, but the flow-beginning temperature may be lower than 400° C.

The second liquid-crystalline polymer is not especially limited as long as it meets the above-mentioned characteristics, and examples thereof include a wholly aromatic polyester, a semi-aromatic polyester and the like. Among them, the wholly aromatic polyester is preferred in view of suppressing the foaming and swelling of the molding article obtained from the resulting polymer composition in the reflowing treatment. Examples of the suitable wholly aromatic polyester include, similarly to the preferable first liquid-crystalline polymer described above, the polymers having a monomeric unit derived from aromatic hydroxycarboxylic acid, a monomeric unit derived from aromatic diol and a monomeric unit derived from aromatic dicarboxylic acid.

The second liquid-crystalline polymer is preferably has a monomeric unit having a crooked structure in the structure. Examples of the monomeric units having the crooked structure include monomeric units having 1,3-phenylene skeleton, monomeric units having 2,3-phenylene skeleton and monomeric units having 2,3-naphthylene skeleton.

The second liquid-crystalline polymer containing the monomeric unit having the crooked structure tends to have the suitable deflection temperature under load, and at the same time, tends to have its liquid-crystallinelinity decreased moderately compared to that of the first liquid-crystalline polymer. As a result, it becomes difficult for the resulting liquid-crystalline polymer composition to generate the warpage and the like at the time of molding and at the time of high temperature processing after molding. From the viewpoint of ensuring such effects, the second liquid-crystalline polymer preferably has the monomeric unit(s) having the crooked structure in the amount of from 10 to 45% by mole, and more preferably in the amount of from 12.5 to 40% by mole.

Specific examples of the monomeric unit having the above-mentioned crooked structure include monomeric units derived from isophthalic acid, phthalic acid, 2,3-naphthalene-dicarboxylic acid, m-aminophenol, resorcin and the derivatives thereof; and monomeric units derived from 3,3'-biphenyldicarboxylic acid, 4,3'-biphenyldicarboxylic acid and the derivatives thereof. Among them, the monomeric units derived from isophthalic acid and resorcin tend to allow the second liquid-crystalline polymer to be the polymer with excellent properties.

Each of the first and second liquid-crystalline polymers are those described above, while it is preferred that the liquid-crystalline polymer composition of the present invention comprises the first liquid-crystalline polymer having all of the monomeric units which the second liquid-crystalline polymer has. In such a liquid-crystalline polymer composition, the compatibility between the first and second liquid-crystalline polymers tends to be good at the time of molding, which results in decreasing the liquid-crystallinelinity (anisotropy) of the liquid-crystalline polymer composition, more effectively.

In the more suitable combinations of the first and second liquid-crystalline polymers include, the first liquid-crystalline polymer has all the monomeric units of the second liquid-crystalline polymer (as described above) and further has the monomeric units other than those units. In such combinations, it is preferred that the other monomeric units in the first liquid-crystalline polymer are monomeric units having no crooked structure. Examples of such monomeric units include a monomeric unit derived from terephthalic acid, and a monomeric unit derived from 2,6-naphthalenedicarboxylic acid.

Even when the first and second liquid-crystalline polymers are composed of the same monomeric units, the first and second liquid-crystalline polymers can be appropriately selected as long as the ratios of the monomeric units of the polymers are different in both polymers so that the polymers have different properties such as the deflection temperature under load.

In the preferable combinations of the first and second liquid-crystalline polymers, for example, each of the first and second liquid-crystalline polymers is a polymer containing (1) the monomeric unit derived from aromatic hydroxycarboxylic acid (hereinafter, referred to as "hydroxycarboxylic acid unit"), (2) the monomeric unit derived from aromatic diol (hereinafter, referred to as "diol unit"), and (3) the monomeric unit derived from aromatic dicarboxylic acid (hereinafter, referred to as "dicarboxylic acid unit"), and such combinations include the following case (A) and case (B).

Case (A):

The first liquid-crystalline polymer is a polymer having at least one of monomeric units derived from p-hydroxybenzoic acid and 2-hydroxy-6-naphthoic acid as hydroxycarboxylic acid unit (1); at least one of monomeric units derived from 4,4'-dihydroxybiphenyl, hydroquinone, resorcin and 2,6-dihydroxynaphthalene as diol unit (2); at least one of monomeric units derived from isophthalic acid as dicarboxylic acid unit (3); and optionally having at least one of monomeric units derived from terephthalic acid and 2,6-naphthalenedicarbocylic acid, while the second liquid-crystalline polymer is a polymer composed of the same monomeric units as those of the first liquid-crystalline polymer except for only containing the monomeric units derived from isophthalic acid as dicarboxylic acid unit (3).

Case (B):

The first liquid-crystalline polymer is a polymer having at least one of monomeric units derived from p-hydroxybenzoic acid and 2-hydroxy-6-naphthoic acid as hydroxycarboxylic acid unit (1); at least one of monomeric units derived from resorcin as diol unit (2); and optionally having at least one of monomeric units derived from 4,4'-dihydroxybiphenyl, hydroquinone and 2,6-dihydroxynaphthalene; and having at least one of monomeric units derived from terephthalic acid, isophthalic acid and 2,6-naphthalenedicarbocylic acid as dicarboxylic acid unit (3), while the second liquid-crystalline polymer is a polymer composed of the same monomeric units as the first liquid-crystalline polymer except for only containing the monomeric units derived from resorcin as diol unit (2).

Among the above-mentioned combination case (A), it is preferred that the first and second polymers are the polymers having, as hydroxycarboxylic acid unit (1), only the monomeric units derived from p-hydroxybenzoic acid. More preferably, the first and second polymers are the polymers having, as diol unit (2), only the monomeric units derived from 4,4'-dihydroxybiphenyl, only the monomeric units derived from hydroquinone, or the monomeric units derived from 4,4'-dihydroxybiphenyl and hydroquinone.

Alternatively, among the above-mentioned combination case (A), it is preferred that the first and second polymers are the polymers having, as hydroxycarboxylic acid unit (1), only the monomeric units derived from 2-hydroxy-6-naphthoic acid as the monomeric unit. Among those combinations, it is preferred that the first and second polymers are the polymers having, as diol unit (2), only the monomeric units derived from 4,4'-dihydroxybiphenyl, only monomeric units derived from hydroquinone, or the monomeric units derived from 4,4'-dihydroxybiphenyl and hydroquinone.

In the present invention, the liquid-crystalline polymer composition may contain the first liquid-crystalline polymer and the second liquid-crystalline polymer in the amount of from 30 to 95% by weight and in the amount of from 5 to 70% by weight, respectively, on the weight basis of the total polymers. In other words, based on the total amounts of the first and second liquid-crystalline polymers, the content of the second liquid-crystalline polymer may be 5 to 70% by weight. The content of the second liquid-crystalline polymer is preferably in the range of from 15 to 60% by weight, and more preferably in the range of from 30 to 45% by weight. When the content of the second liquid-crystalline polymer is larger than 70% by weight, the heat resistance of the polymer composition may be decreased, which may cause remarkable transformation of the resulting molded articles in reflowing and the like. On the other hand, when the content is less than 5% by weight, the suppressing of the generation of warpage in the molded articles may be insufficient.

Moreover, in the liquid-crystalline polymer composition, each of the first liquid-crystalline polymer and the second liquid-crystalline polymer is preferably a powdery with the average particle diameter of 1 mm or less, and more preferable with the average particle diameter of from 0.1 mm to 1 mm. The shape of particles composing the powder is not especially limited. The shape may be sphere-like, fiber-like or plate-like one. When the first and second liquid-crystalline polymers both have the average particle diameter as mentioned above, the first and second liquid-crystalline polymers tend to uniformly disperse in the resulting liquid-crystalline polymer composition. In such a case, the effect of decreasing the anisotropy due to the mixing of the first and second polymers is more remarkable, thereby decreasing the warpage of the resulting molded article further.

Moreover, the second liquid-crystalline polymer is preferably a polymer obtained by polymerizing a powdery prepolymer having the average particle diameter of 1 mm or less in the solid phase. The second liquid-crystalline polymer can excellently decrease the anisotropy of the resulting liquid-crystalline polymer composition.

The liquid-crystalline polymer composition of the present invention preferably further comprises an organic or inorganic filler, in addition to the above-mentioned first and second liquid-crystalline polymers. In containing the organic or inorganic filler, the warpage of the resulting molded articles can be more decreased. The shape of the organic and or inorganic filler is not limited, and may be sphere-like (powdery), fiber-like or plate-like one.

Examples of the fibrous inorganic fillers include glass fiber, silica fiber, silica-alumina fiber, alumina fiber, zirconia fiber, boron nitride fiber, silicon nitride fiber, boron fiber, potassium titanate fiber, fibers of silicates such as wollastonite, magnesium sulfate fiber, aluminum borate fiber; and additionally include fibrous materials and the like of metals such as stainless steel, aluminum, titanium, copper and brass. Among them, glass fiber is suitable.

Examples of the powdery inorganic fillers include carbon black, graphite, silica, quartz powder, glass beads, milled glass fiber, glass balloon, glass powder, calcium silicate, aluminum silicate, kaolin, clay, diatomaceous earth, silicates such as wollastonite, metallic oxides such as iron oxide, titanium oxide, zinc oxide, antimony trioxide and alumina, metal carbonates such as calcium carbonate and magnesium carbonate, metal sulfates such as calcium sulfate and barium sulfate; and additionally include ferrite, silicon carbide, silicon nitride, boron nitride, metallic powder and the like. Further, plate-like fillers include mica, glass flakes, talc, and various metallic foils are also included.

Examples of the organic fillers include organic fibrous substances having high melting point such as polyamide, fluorocarbon resin, polyester resin and acrylic resin; and synthetic fibers having heat resistance and high strength such as aromatic polyester fibers, liquid-crystalline polymer fibers, aromatic polyamide fibers and polyimide fibers.

As for these organic or inorganic fillers, one kind of them can be used alone, or two or more kinds of them can be used together. Particularly, when the organic filler is used together with the inorganic filler, the molded articles obtained from the resulting liquid-crystalline polymer composition tends to be excellent in mechanical strength, dimensional accuracy, electrical property and the like.

The organic or inorganic filler may be contained in the amount of from 1 to 80% by weight, preferably in the amount of from 5 to 65% by weight and more preferable in the amount of from 20 to 55% by weight, on the basis of the resulting liquid-crystalline polymer composition. When the organic filler and the inorganic filler are contained in combination, the total amount of them is preferably in the above-mentioned ranges. When the amount of the organic or inorganic filler is less than 1% by weight, the suppressing of the generation of warpage in the molded articles may be insufficient. On the other hand, when the amount is over 80% by weight, the mechanical strength of the molded articles might be decreased, undesirably.

The liquid-crystalline polymer composition of the present invention, as a whole, preferably has a deflection temperature under load of 220° C. or higher, more preferable of 230° C. or higher and further more preferably of 250° C. or higher. Using such a liquid-crystalline polymer composition having the deflection temperature under load of 220° C. or higher, the resulting molded article tends to have smaller warpage and to have excellent heat resistance.

Moreover, the liquid-crystalline polymer composition may further contain other components, in addition to the first and second liquid-crystalline polymers and the organic or inorganic filler, as long as the properties of the polymer composition described above are not impaired. Examples of such other components include resins other than the above-mentioned resins, coupling agents, ultraviolet absorbers and heat stabilizers.

The liquid-crystalline polymer composition in the present invention is preferably produced in the method described below.

For example, the liquid-crystalline polymer composition of the present invention may be produced in the method comprising the steps of:

polymerizing s first powdery prepolymer having the average particle diameter of 1 mm or less in the solid phase to obtain a first liquid-crystalline polymer having a deflection temperature under load of 200° C. or higher;

polymerizing a second powdery prepolymer having the average particle diameter of 1 mm or less in a solid phase to obtain a second liquid-crystalline polymer having a lower deflection temperature under load than that of the above-mentioned first liquid-crystalline polymer and having a melting point; and mixing the first liquid-crystalline polymer and the second liquid-crystalline polymer.

By such a method, the liquid-crystalline polymer composition of the present invention can be produced, efficiently.

More specifically, the following method can be applied to produce the liquid-crystalline polymer composition of the present invention.

First, the first and second prepolymers are prepared by reacting respective raw material monomers for the first and second liquid-crystalline polymers. When the first and second liquid-crystalline polymers to be produced are the above-mentioned wholly aromatic polyesters, the first and second prepolymers can be synthesized by the method in which the hydroxyl groups in the raw material monomers are acylated with acid anhydride, and the transesterification between the acylated groups and the carboxyl groups in the raw material monomers is carried out. Examples of such a method are disclosed in Japanese Patent Application Laid-open Publication Nos. 2002-220444 and 2002-146003. The prepolymers obtained thus preferably have the molecular weight of from 2000 to 60000.

Next, after the obtained first and second prepolymer are cooled to a room temperature respectively to prepare the solids thereof, the solid are subjected to crushing or the like to prepare the first and second prepolymers with the powdery state such as powder and flake. The first and second prepolymers are preferably prepared so as to have the average particle diameter of 1 mm or less, and more preferably to have the average particle diameter of 0.1 to 1 mm.

The first and second prepolymers are subjected to solid polymerization (in the powder state) by heating or the, thereby allowing them to have a high molecular weight. By such a procedure, the first and second powdery liquid-crystalline polymer, which preferably has the average particle diameter of 1 mm or less and more preferably of from 0.1 to 1 mm, can be obtained. Such a solid polymerization is preferably carried out until the first and second liquid-crystalline polymers have the above-described physical properties such as deflection temperature under load.

Into the obtained first and second liquid-crystalline polymers, the organic or inorganic filler and/or other components are added, if necessary, to provide a liquid-crystalline polymer composition of the present invention. More specifically, the filler (as well as other components) may be added, for example, by a method (1) in which the filler is compounded into the respective first liquid-crystalline polymer and the second liquid-crystalline polymer, and then these are mixed with an extruder, a kneader or the like; a method (2) in which the filler is mixed with the respective first liquid-crystalline polymer and the second liquid-crystalline polymers, the resulting mixtures were respectively made into pellets, and the both pellets of the polymers are combined together at the time of molding; or a method (3) in which the first liquid-crystalline polymer and the second liquid-crystalline polymer are mixed together, the filler is added to and then mixed with the resulting mixture using an extruder, a kneader or the like.

The liquid-crystalline polymer composition of the above-described embodiment can be easily molded to make a molded article having a desired shape. Due to the properties obtained by combining the above-mentioned first and second liquid-crystalline polymers, the liquid-crystalline polymer composition of the present invention excellent in flowability when being melted, and is able to be molded at low temperature. Examples of the molding method include an injection molding, an extrusion molding and a compression molding. By such a molding method, the articles having various shapes such as a stereoscopic shape, a fiber shape and a film shape.

As described above, the liquid-crystalline polymer composition can reduce warpage of the molded articles. In addition to that, the liquid-crystalline polymer composition can reduce warpage of the molded articles not only in molding but also during a high temperature processing after the molding, such as reflowing. Consequently, the molded article of the liquid-crystalline polymer composition is suitable as electronic parts for the surface mounting such as a printed circuit board, a semiconductor, a resistance, a condenser, a coil, a switch, a relay and a connector. Among them, the molded article is suitable as a planate connector like a substrate-to-substrate connector for a flexible printed board, a fine pitch multiterminal connector, a card connector, a socket for memory and a CPU socket. The planate connector is a part for connecting packages such as LSI and memory, which are connected by surface mounting, to the printed circuit board, or a part for connecting circuit for communication with another substrate to the printed circuit board.

Figure 1:
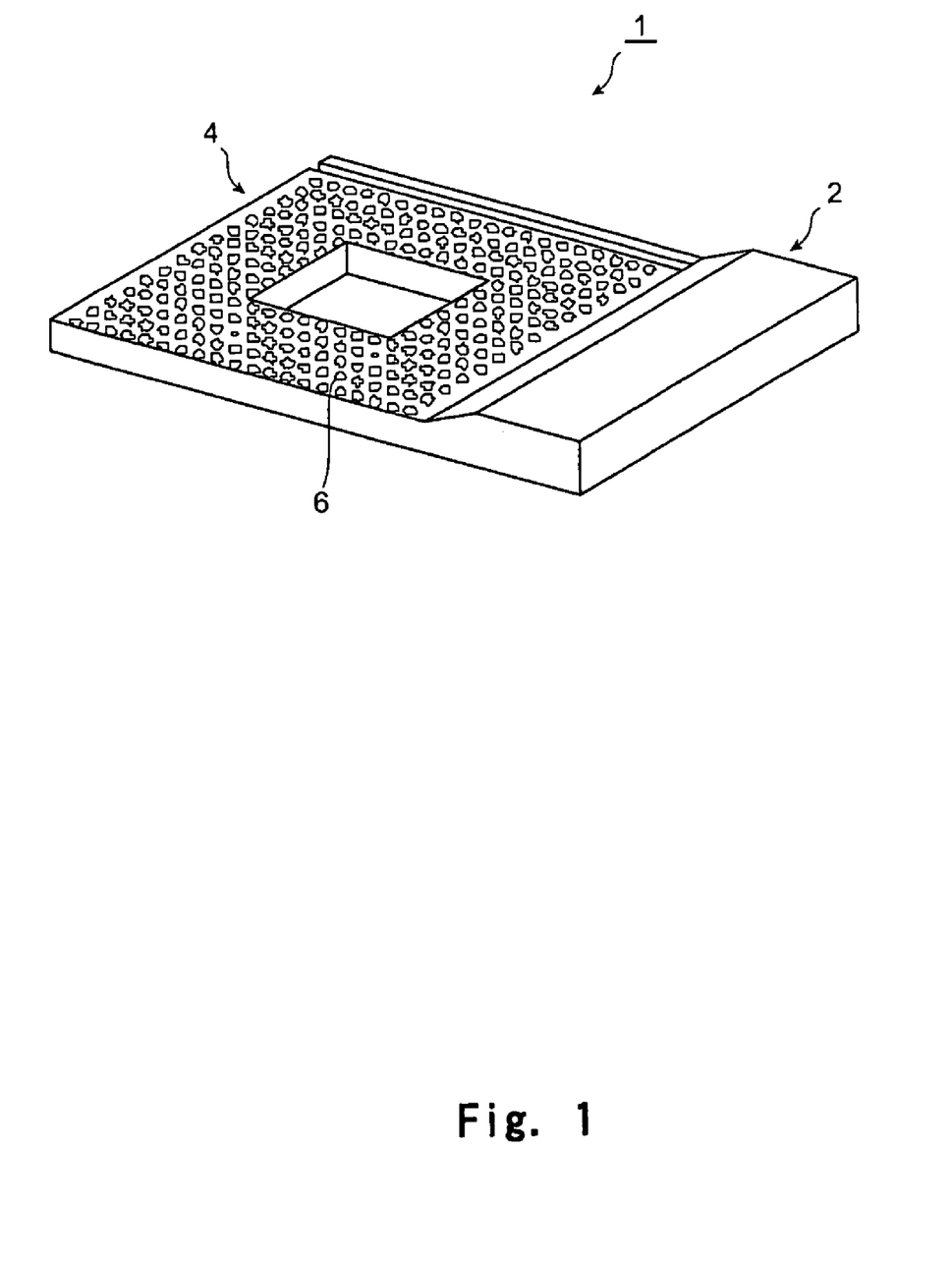
FIG. 1 shows a perspective view showing a planate connector.

FIG. 1 is a perspective view showing a planate connector which is an example of the molded articles. Planate connector 1 is composed of main body part 2 and rib part 4 on the surface of which a large number of ribs are prepared, and these are the parts that the above-described liquid-crystalline polymer composition is molded, respectively. Main body part 2 is comparatively thick and has the function of maintaining the strength of planate connector 1. Moreover, rib part 4 is a structure thinned compared with main body part 2. This planate connector 1, for example, is put on a printed circuit board, and can connect the printed circuit board and a surface-mounted part by metallic terminals of the surface-mounted part and the like being inserted in rib 6 in rib part 4. In planate connector 1, the wide and thickness of main body part 2 and rib part 4, the ratio of main body part 2 and rib part 4, their shapes, and others are decided according to demanded strength and number of pins.

Since planate connector 1 consists of the molded product of the liquid-crystalline polymer composition in the above-described present embodiment, regardless of having such thin rib part 4, it becomes the one where the generation of the warpage is a little even when solder reflowing and the like are conducted. Consequently, planate connector 1 is excellent in the stability of the shape and size and suitably applied as a connector when conducting solder reflowing and the like.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application No. 2006-035644 filed on Feb. 13, 2006, including specification, claims, drawings and summary, are incorporated herein by reference in their entirety.

EXAMPLES

The present invention is described in more detail by following Examples, which should not be construed as a limitation upon the scope of the present invention.

Flow initiation temperature, glass transition temperature, melting point and deflection temperature under load mentioned below were measured by the following methods, respectively.

Flow Initiation Temperature:

Flow initiation temperature was measured with the use of a flow tester (CFT-500 type, manufactured by Shimadzu Corporation). Specifically, first, the sample of about 2 g was filled in the capillary type rheometer which was equipped with the die of 1 mm in inside diameter and 10 mm in length. And, while the load of 9.8 MPa (100 kg/cm$^2$) was added and the liquid-crystalline polymer was extruded from the nozzle at the temperature rising speed of 4° C./minute, the temperature when melting viscosity showing 4800 Pa·s (48000 poise) was measured, and this temperature was assumed to be the flow initiation temperature.

Glass Transition Temperature Measurement and Melting Point Measurement:

As for the polymer to be measured, the calorie profile obtained at the temperature rising speed of 10° C./minute was measured by the use of the analytical differential scanning calorimetry system "DSC 6200" manufactured by Seiko Instruments Inc., and the lowest temperature of the endothermic peak in the obtained endothermic curve was assumed to be the melting point. Moreover, the temperature which became the inflection point in the endothermic curve, which appeared on the low temperature side from the melting point, was assumed to be the glass transition temperature.

Deflection Temperature Under Load:

Pellets were obtained using the polymer to be measured. After drying the pellets at a temperature of 120° C. for 3 hours, a test piece (127 mm in length, 12.7 mm in width and 6.4 mm in thickness) was prepared using an injection molding machine (Model, PS40E5ASE; manufactured by Nisshin Resin Company Limited) at a cylinder temperature of 350° C. and a mold temperature of 70° C. (for polymers obtained in Synthesis Examples 3-6 below) or of 130° C. (for polymers obtained in Synthesis Examples 1-2 below and the polymer compositions prepared below). A deflection temperature under load of the polymer to be measured was measured in accordance with ASTM D648 under the load of 18.6 kg/cm² using thus-obtained test piece.

Synthesis Example 1

In a reactor equipped with a stirring device, a torque meter, a nitrogen gas introduction pipe, a thermometer, and a reflux condenser, 911 g (6.6 moles) of p-hydroxybenzoic acid, 409 g (2.2 moles) of 4,4'-dihydroxybiphenyl, 91 g (0.55 moles) of isophthalic acid, 274 g (1.65 moles) of terephthalic acid, and 1235 g (12.1 moles) of acetic anhydride were added, and these were stirred. Next, 0.17 g of 1-methylimidazol was added in the mixture after having been stirred. After the inside of the reactor was sufficiently substituted with nitrogen gas, the temperature in the mixture was raised up to 150° C. for 15 minutes under nitrogen gas flow, and the mixture was refluxed for one hour while maintaining the temperature. Then, after 1.7 g of 1-methylimidazol was further added, the temperature was raised up to 320° C. over two hours and 50 minutes while removing the distillate of by-product acetic acid and unreacted acetic anhydride. The point of time when the rise of the torque was admitted was considered to be the end of the reaction, and the contents were taken out.

Next, after being cooled to room temperature, the contents taken out were crushed with a crusher to give the powder of the prepolymer having the particle diameter of about 0.1 mm to about 1 mm. A portion of the prepolymer was taken out to measure a flow initiation temperature of the prepolymer. As a result, the flow initiation temperature was 257° C.

Then, after the prepolymer powder was heated from 25° C. to 250° C. over one hour, the powder was heated from this temperature to 285° C. over five hours, and further kept at the temperature for three hours to be polymerized in the solid phase. The powder after the solid phase polymerization was cooled to give a liquid-crystalline polymer. The flow initiation temperature of the obtained liquid-crystalline polymer was measured by the same method as mentioned above. As a result, the temperature was 327° C. Moreover, the DSC measurement of the liquid-crystalline polymer was conducted. As a result, the melting point was 340° C., while the glass transition temperature was not observed.

Furthermore, a portion of the liquid-crystalline polymer was made into pellets by granulation, and the pellets were processed by the injection molding to provide a test piece for measuring a deflection temperature under load of the polymer. The deflection temperature under load was measured using the obtained test piece. As a result, the temperature was 241° C.

Synthesis Example 2

In a reactor equipped with a stirring device, a torque meter, a nitrogen gas introduction pipe, a thermometer, and a reflux condenser, 995 g (7.2 moles) of p-hydroxybenzoic acid, 447 g (2.4 moles) of 4,4'-dihydroxybiphenyl, 159 g (0.96 moles) of isophthalic acid, 239 g (1.44 moles) of terephthalic acid, and 1348 g (13.2 moles) of acetic anhydride were added, and these were stirred. Next, 0.18 g of 1-methylimidazol was added in the mixture after stirring. After the inside of the reactor was sufficiently substituted with nitrogen gas, the temperature in the mixture was raised up to 150° C. over 15 minutes under nitrogen gas flow, and the mixture was refluxed for one hour while maintaining the temperature. Then, after 1.8 g of 1-methylimidazol was further added, the temperature was raised up to 320° C. over two hours and 50 minutes while removing the distillate of by-product acetic acid and unreacted acetic anhydride. The point of time when the rise of the torque was admitted was considered to be the end of the reaction, and the contents were taken out.

Next, the contents taken out were treated similarly to the contents in Synthesis example 1, and the powder of the prepolymer having the particle diameter of about 0.1 mm to about 1 mm was obtained. A portion of the prepolymer was taken out to measure a flow initiation temperature of the prepolymer. As a result, the flow initiation temperature was 242° C.

Then, after the prepolymer powder was heated from 25° C. to 200° C. over one hour, the powder was heated from this temperature to 242° C. over five hours, and further kept at the temperature for three hours to be polymerized in the solid phase. The powder after the solid phase polymerization was cooled to give a liquid-crystalline polymer. The flow initiation temperature of the liquid-crystalline polymer was measured by the same method as mentioned above. As a result, the temperature was 288° C. Moreover, the DSC measurement of the liquid-crystalline polymer was conducted. As a result, the melting point was 310° C., while the glass transition temperature was not observed.

Furthermore, a portion of the liquid-crystalline polymer was made into pellets by granulation, and the pellets were processed by the injection molding to provide a test piece for measuring a deflection temperature under load of the polymer. The deflection temperature under load was measured using the obtained test piece. As a result, the temperature was 220° C.

Synthesis Example 3

In a reactor equipped with a stirring device, a torque meter, a nitrogen gas introduction pipe, a thermometer, and a reflux condenser, 828 g (6.0 moles) of p-hydroxybenzoic acid, 559 g (3.0 moles) of 4,4'-dihydroxybiphenyl, 498 g (3.0 moles) of isophthalic acid, and 1348 g (13.2 moles) of acetic anhydride were added, and these were stirred. Next, 0.19 g of 1-methylimidazol was added in the mixture after stirring. After the inside of the reactor was sufficiently substituted with nitrogen gas, the temperature in the mixture was raised up to 150° C. over 15 minutes under the current of nitrogen gas, and the mixture was refluxed for one hour while maintaining the temperature. After that, the temperature was raised up to 320° C. over two hours and 50 minutes while removing the distillate of by-product acetic acid and unreacted acetic anhydride. The point of time when the rise of the torque was admitted was considered to be the end of the reaction, and the contents were taken out.

Next, the contents taken out were treated similarly to the contents in Synthesis example 1, and the powder of the prepolymer having the particle diameter of about 0.1 mm to about 1 mm was obtained. A portion of the prepolymer was taken out to measure a flow initiation temperature of the prepolymer. As a result, the flow initiation temperature was 230° C.

Then, after the prepolymer powder was heated from 25° C. to 200° C. over one hour, the powder was heated from this temperature to 240° C. over five hours, and further kept at the temperature for three hours to be polymerized in the solid phase. The powder after the solid phase polymerization was cooled to give a liquid-crystalline polymer. The flow initiation temperature of the liquid-crystalline polymer was measured by the same method as mentioned above. As a result, the temperature was 283° C. Moreover, the DSC measurement of the liquid-crystalline polymer was conducted. As a result, the polymer had a glass transition temperature of 129° C. and a melting point of 326° C.

Furthermore, a portion of the liquid-crystalline polymer was made into pellets by granulation, and the pellets were processed by the injection molding to provide a test piece for measuring a deflection temperature under load of the polymer. The deflection temperature under load was measured using the obtained test piece. As a result, the temperature was 133° C.

Synthesis Example 4

In a reactor equipped with a stirring device, a torque meter, a nitrogen gas introduction pipe, a thermometer, and a reflux condenser, 1243 g (9.0 moles) of p-hydroxybenzoic acid, 279 g (1.5 moles) of 4,4'-dihydroxybiphenyl, 249 g (1.5 moles) of isophthalic acid, and 1348 g (13.2 moles) of acetic anhydride were added, and these were stirred. Next, 0.19 g of 1-methylimidazol was added in the mixture after stirring. After the inside of the reactor was sufficiently substituted with nitrogen gas, the temperature in the mixture was raised up to 150° C. over 15 minutes under nitrogen gas flow, and the mixture was refluxed for one hour while maintaining the temperature. After that, the temperature was raised up to 320° C. over two hours and 50 minutes while removing the distillate of by-product acetic acid and unreacted acetic anhydride. The point of time when the rise of the torque was admitted was considered to be the end of the reaction, and the contents were taken out.

Next, the contents taken out were treated in the same manner as in Synthesis Example 1, and the powder of the prepolymer having the particle diameter of about 0.1 mm to about 1 mm was obtained. The flow initiation temperature of the prepolymer was measured to be 262° C.

Then, after the prepolymer powder was heated from 25° C. to 200° C. over one hour, the powder was heated from this temperature to 260° C. over five hours, and further kept at the temperature for three hours to be polymerized in the solid phase. The powder after the solid phase polymerization was cooled to give a liquid-crystalline polymer. The flow initiation temperature of the liquid-crystalline polymer was measured by the same method as mentioned above. As a result, the temperature was 307° C. Moreover, the DSC measurement of the liquid-crystalline polymer was conducted. As a result, the liquid-crystalline polymer had a glass transition temperature of 104° C. and a melting point of 312° C.

Furthermore, a portion of the liquid-crystalline polymer was made into pellets by granulation, and the pellets were processed by the injection molding to provide a test piece for measuring a deflection temperature under load of the polymer. The deflection temperature under load was measured using the obtained test piece. As a result, the temperature was 138° C.

Synthesis Example 5

The prepolymer powder was obtained in the same manner as in Synthesis Example 3. After the prepolymer powder was heated from 25° C. to 200° C. over one hour, the powder was heated from this temperature to 220° C. over five hours, and further kept at the temperature for three hours to be polymerized in the solid phase. The powder after the solid phase polymerization was cooled to give a liquid-crystalline polymer. The flow initiation temperature of the liquid-crystalline polymer was measured by the same method as mentioned above. As a result, the flow initiation temperature was 265° C. Moreover, the DSC measurement of the liquid-crystalline polymer was conducted. As a result, the liquid-crystalline polymer had a glass transition temperature of 127° C. and a melting point of 293° C.

Furthermore, a portion of the liquid-crystalline polymer was made into pellets by granulation, and the pellets were processed by the injection molding to provide a test piece for measuring a deflection temperature under load of the polymer. The deflection temperature under load was measured using the obtained test piece. As a result, the temperature was 136° C.

Synthesis Example 6

In a reactor equipped with a stirring device, a torque meter, a nitrogen gas introduction pipe, a thermometer, and a reflux condenser, 941 g (5.0 moles) of 2-hydroxy-6-naphthoic acid, 273 g (2.5 moles) of 4-aminophenol, 415 g (2.5 moles) of isophthalic acid, and 1123 g (11 moles) of acetic anhydride were added, and these were stirred. After the inside of the reactor was sufficiently substituted with nitrogen gas, the temperature in the mixture was raised up to 150° C. over 15 minutes under the current of nitrogen gas, and the mixture was refluxed for 3 hour while maintaining the temperature. After that, the temperature was raised up to 320° C. over 2 hours and 50 minutes while removing the distillate of by-product acetic acid and unreacted acetic anhydride. The point of time when the rise of the torque was admitted was considered to be the end of the reaction, and the contents were taken out.

Next, the contents taken out were treated similarly to the contents in Synthesis Example 1, and the powder of the prepolymer having the particle diameter of about 0.1 mm to about 1 mm was obtained. When a part of the powder of the obtained prepolymer was taken out and the flow initiation temperature was measured, it was 182° C.

Then, after the prepolymer powder was heated from 25° C. to 200° C. over one hour, the powder was heated from this temperature to 250° C. over five hours, and further kept at the temperature for 10 hours to be polymerized in a solid phase. As a result, a material in melt state was obtained. The material was then grinded with a grinder to obtain an intermediate polymer having a size of from about 0.1 mm to about 1 mm.

After the intermediate polymer was heated from 25° C. to 180° C. over one hour, the polymer was heated from this temperature to 255° C. over five hours, and further kept at the temperature for 3 hours to be polymerized in a solid phase.

The polymer after the solid phase polymerization was cooled to give a liquid-crystalline polymer. The flow initiation temperature of the obtained liquid-crystalline polymer was measured by the same method as mentioned above. As a result, the temperature was 323° C. Moreover, the DSC measurement of the liquid-crystalline polymer was conducted. As a result, the glass transition temperature was 160° C., while the melting point was not observed.

Furthermore, a portion of the liquid-crystalline polymer was made into pellets by granulation. The pellets were processed by the injection molding to provide a test piece for measuring a deflection temperature under load of the polymer. The deflection temperature under load was measured using the obtained test piece. As a result, the temperature was 152° C.

Examples 1 to 4 and Comparative Example 1 to 8

The liquid-crystalline polymers of Synthesis Examples 1 to 6 and chopped glass fiber (CS03JAPX-1, manufactured by Asahi Fiber-Glass Co., Ltd.) as a filler were mixed in the mixing amount (unit: parts by weight) shown in Table 1 and kneaded to obtain liquid-crystalline polymer compositions. The liquid-crystalline polymer compositions were granulated at a cylinder temperature of 340° C. using a biaxial extrusion machine (Model PCM-30; manufactured by Ikegai Tekko Co., Ltd.) to obtain pellets thereof. After drying at 120° C. for 3 hours, the pellets were molded at a cylinder temperature of 350° C. and a mold temperature of 130° C. using an injection molding machine (Model, PS40E5ASE; manufactured by Nissei Plastic Industrial Co., Ltd.). Using the resulting molded articles, the deflection temperature under load of each of the articles was measured in the above-described method, which was shown in Table 2.

Property Evaluation:

Using the liquid-crystalline polymer compositions shown in Table 1 above, warpage in molded articles obtained from the composition was evaluated, and Solder Foaming Test of the molded articles was conducted, respectively.

Evaluation of Warpage in Molded Articles:

The liquid-crystalline polymer composition to be evaluated was granulated to obtain pellets thereof. After drying at 120° C. for 3 hours, the pellets were molded at a cylinder temperature of 350° C. and a mold temperature of 130° C. using an injection molding machine (UH1000, manufactured by Nissei Plastic Industrial Co., Ltd.) with a disk metallic mold to give a discoid sample of 64 mm in diameter and 0.5 mm in thickness. Then, the obtained sample was put on a surface plate, and assuming that the outer periphery of the disk to be a reference plane and a part being the most away from the surface plate to be a gate part, displacement was searched by measuring the height from reference plane to the gate part with a micrometer. The obtained value was assumed to be the amount of the warpage of the molded article after molding.

Next, the sample after the warpage had been measured was put in an oven which the internal atmosphere was kept at 260° C. and heat-treated for 90 seconds. After the treatment, the sample was taken out, and the amount of the warpage was searched by the same method as mentioned above. The obtained value was assumed to be the amount of the warpage after the heat treatment.

The measurements of warpage of the molded articles after the molding and after heat treatment mentioned above were respectively conducted five times for each of compositions, and the average values of these measurements are listed in Table 3 below. "Change in shape" in Table 3 means the case where the shape of article was extremely changed so that the value of warpage of the article was not measured.

Solder Foaming Test:

The composition to be measured was made into pellets. After drying at 120° C. for 3 hours, the pellets were molded at a cylinder temperature of 350° C. and a mold temperature of 130° C. using an injection molding machine (Model,

TABLE 1

| | First Liquid-Crystalline Polymer (Parts) | | Second Liquid-Crystalline Polymer (Parts) | | Other Liquid-Crystalline Polymer (Parts) | | Filler (Parts) |
|---|---|---|---|---|---|---|---|
| | Synthesis Example 1 | Synthesis Example 2 | Synthesis Example 3 | Synthesis Example 4 | Synthesis Example 5 | Synthesis Example 6 | |
| Example 1 | 45.5 | 0 | 19.5 | 0 | 0 | 0 | 35 |
| Example 2 | 39 | 0 | 0 | 26 | 0 | 0 | 35 |
| Example 3 | 35.75 | 0 | 0 | 29.25 | 0 | 0 | 35 |
| Example 4 | 55.25 | 0 | 9.75 | 0 | 0 | 0 | 35 |
| Comparative Example 1 | 65 | 0 | 0 | 0 | 0 | 0 | 35 |
| Comparative Example 2 | 0 | 0 | 65 | 0 | 0 | 0 | 35 |
| Comparative Example 3 | 35.75 | 29.25 | 0 | 0 | 0 | 0 | 35 |
| Comparative Example 4 | 63.05 | 0 | 1.95 | 0 | 0 | 0 | 35 |
| Comparative Example 5 | 17.55 | 0 | 47.45 | 0 | 0 | 0 | 35 |
| Comparative Example 6 | 45.5 | 0 | 0 | 0 | 0 | 19.5 | 35 |
| Comparative Example 7 | 55.25 | 0 | 0 | 0 | 0 | 9.75 | 35 |
| Comparative Example 8 | 45.5 | 0 | 0 | 0 | 19.5 | 0 | 35 |

TABLE 2

| | Deflection Temperature under Load (° C.) |
|---|---|
| Example 1 | 250 |
| Example 2 | 260 |
| Example 3 | 254 |
| Example 4 | 259 |
| Comparative Example 1 | 281 |
| Comparative Example 2 | 154 |
| Comparative Example 3 | 266 |
| Comparative Example 4 | 276 |
| Comparative Example 5 | 175 |
| Comparative Example 6 | 154 |
| Comparative Example 7 | 209 |

PS40E5ASE; manufactured by Nissei Plastic Industrial Co., Ltd.) to provide a sample dumbbell (thickness of 1.2 mm) described in JIS K71131(1/1). The obtained sample was immersed in the H60A solder (60% of tin and 40% of lead) of 260° C. for 60 seconds. After that, the sample was pulled up, and surface of the sample was observed. The results (whether or not foaming or swelling of the sample was observed) are shown in Table 3.

TABLE 3

| | Warpage of Molded Article (mm) | | Result of Solder |
|---|---|---|---|
| | After Molding | After Heat Treatment | Foaming Test Foaming or Swelling |
| Example 1 | 0.17 | 0.29 | Not observed |
| Example 2 | 0.17 | 0.35 | Not observed |
| Example 3 | 0.17 | 0.34 | Not observed |
| Example 4 | 0.31 | 0.47 | Not observed |
| Comparative Example 1 | 1.04 | 1.87 | Not observed |
| Comparative Example 2 | 0.22 | Change in shape | Not observed |
| Comparative Example 3 | 0.56 | 1.09 | Not observed |
| Comparative Example 4 | 1.01 | 1.75 | Not observed |
| Comparative Example 5 | 0.21 | Change in shape | Not observed |
| Comparative Example 6 | 0.22 | Change in shape | Not observed |
| Comparative Example 7 | 0.29 | Change in shape | Not observed |
| Comparative Example 8 | — | — | Observed |

Based on the results shown in Table 3, it was confirmed that the molded articles obtained in Examples 1-4 (in the present invention) have smaller warpages in molding and especially after heat treatment than those obtained in Comparative Examples.

In addition to the above evaluation, flexural properties (flexural strength and flexural modulus) were evaluated as to the molded articles of the compositions obtained in Example 1 and in Comparative Examples 1-3. The flexural strength and flexural modulus were measured by the following method:

The composition to be measured was made into pellets. After drying at 120° C. for 3 hours, the pellets were molded at a cylinder temperature of 350° C. and a mold temperature of 130° C. using an injection molding machine (Model, PS40E5ASE; manufactured by Nissei Plastic Industrial Co., Ltd.) to provide a sample with a length of 127 mm, a width of 12.7 mm and a thickness of 6.4 mm. Using the sample, the flexural strength and flexural modulus were measured in accordance with ASTMD790.

The flexural strengths of the molded articles of the compositions obtained in Example 1 and Comparative Examples 1-3 were 156 MPa, 151 MPa, 156 MPa and 150 MPa, respectively; and the flexural modulus of the molded articles of Example 1 and Comparative Examples 1-3 were 11500 MPa, 11900 MPa, 11100 MPa and 11400 MPa, respectively. Based on such results, it was confirmed that the molded article obtained in the present invention has advantages without accompanying lowering flexural properties, compared to the molded articles obtained in Comparative Examples.

What is claimed is:

1. A liquid-crystalline polymer composition comprising:
   (i) 30 to 95% by weight of a first liquid-crystalline polymer having a deflection temperature under load of 200° C. or higher, and
   (ii) 5 to 70% by weight of a second liquid-crystalline polymer having a deflection temperature under load lower than that of the first liquid-crystalline polymer, a melting point from 270° C. to lower than 400° C. and a flow-beginning temperature of 270° C. or higher,
   and wherein the second liquid-crystalline polymer has 12.5 to 45% by mole of at least one monomeric unit selected from the group consisting of a monomeric unit having 1,3-phenylene skeleton, a monomeric unit having 2,3-phenylene skeleton and a monomeric unit of 2,3-naphthylene skeleton.

2. The liquid-crystalline polymer composition according to claim 1, wherein the first liquid-crystalline polymer has a monomeric unit derived from aromatic hydroxycarboxylic acid, a monomeric unit derived from aromatic diol and a monomeric unit derived from aromatic dicarboxylic acid.

3. The liquid-crystalline polymer composition according to claim 1, wherein the second liquid-crystalline polymer is a polymer having an ester bond.

4. The liquid-crystalline polymer composition according to claim 1, wherein the melting point of the second liquid-crystalline polymer is 295° C. or higher.

5. The liquid-crystalline polymer composition according to claim 1, wherein the first liquid-crystalline polymer has all of monomeric units which the second liquid-crystalline polymer has.

6. The liquid-crystalline polymer composition according to claim 1, wherein the first liquid-crystalline polymer and the second liquid-crystalline polymer are powder having an average particle diameter of 1 mm or less, respectively.

7. The liquid-crystalline polymer composition according to claim 1, wherein the second liquid-crystalline polymer is a liquid-crystalline polymer obtained by polymerizing a powdery prepolymer having the average particle diameter of 1 mm or less in a solid phase.

8. The liquid-crystalline polymer composition according to claim 1, further comprising organic fillers and/or inorganic fillers.

9. The liquid-crystalline polymer composition according to claim 1, wherein the composition has a deflection temperature under load of 220° C. or higher.

10. A molded article obtainable by molding the liquid-crystalline polymer composition according to claim 1.

11. A planate connector obtainable by molding the liquid-crystalline polymer composition according to claim 1.

12. A method for producing a liquid-crystalline polymer composition, the method comprising the steps of:
   (a) polymerizing a first powdery prepolymer having the average particle diameter of 1 mm or less in a solid phase to obtain a first liquid-crystalline polymer having a deflection temperature under load of 200° C. or higher;
   (b) polymerizing a second powdery prepolymer having the average particle diameter of 1 mm or less in a solid phase to obtain a second liquid-crystalline polymer having a deflection temperature under load lower than that of the first liquid-crystalline polymer, a melting point from 270° C. to lower than 400° C. and a flow-beginning temperature of 270° C. or higher; and
   (c) mixing the first liquid-crystalline polymer and the second liquid-crystalline polymer.

13. The method for producing a liquid-crystalline polymer composition according to claim 12, wherein the melting point of the second liquid-crystalline polymer obtained in step (b) is 295° C. or higher.

* * * * *